Nov. 24, 1959     R. H. W. KROEKEL     2,914,348
SEALING RING ASSEMBLY
Filed March 1, 1957
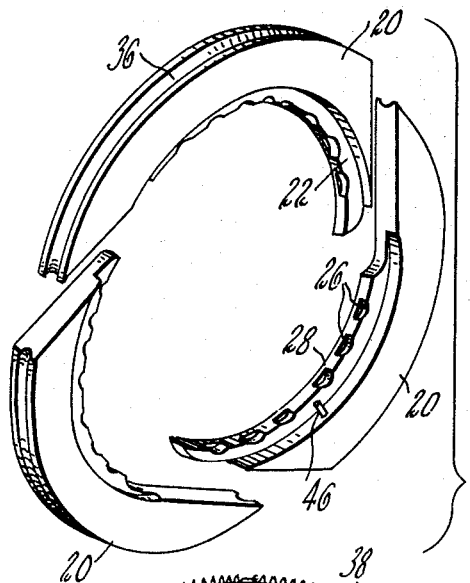
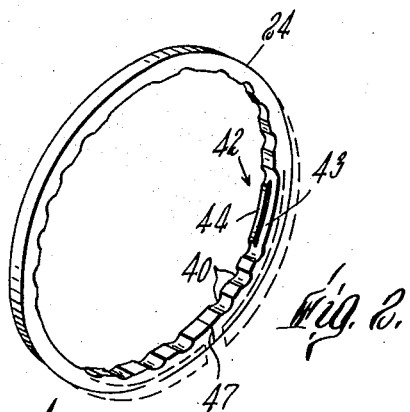
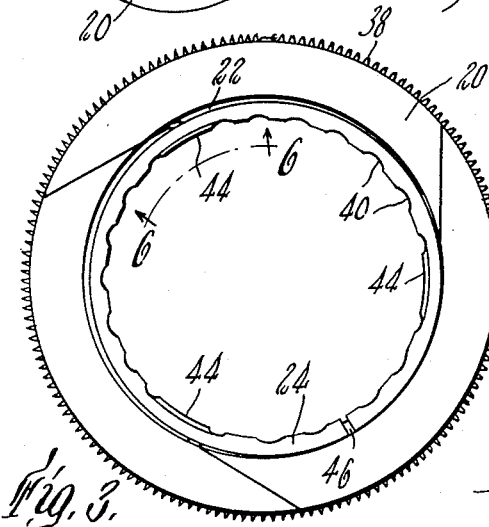
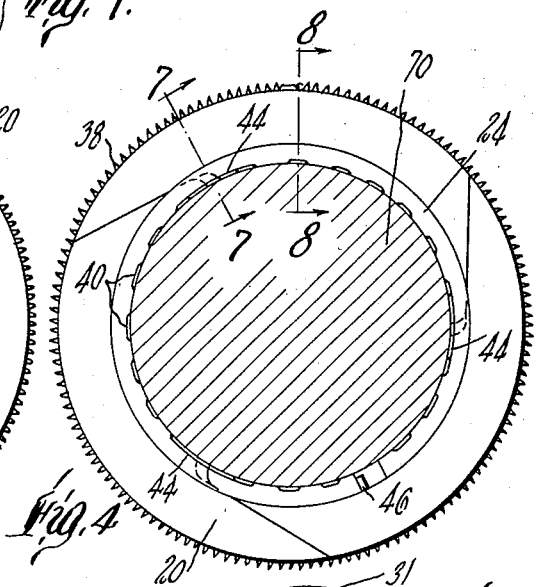
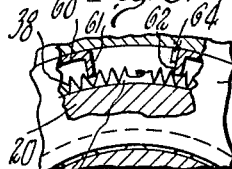
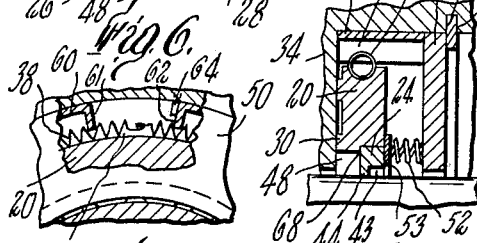
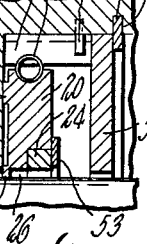
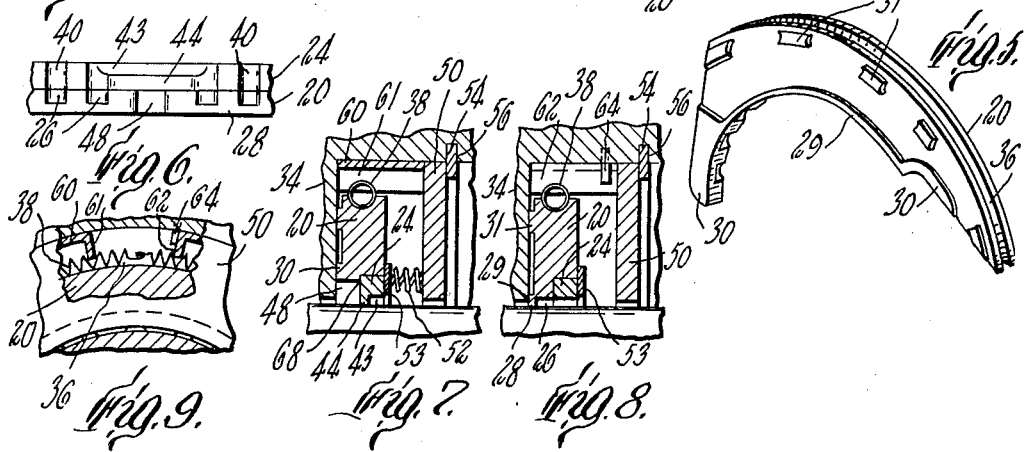

United States Patent Office 2,914,348
Patented Nov. 24, 1959

2,914,348

SEALING RING ASSEMBLY

Rolf H. W. Kroekel, West Greenwich, R.I., assignor to Sealol Corp., Providence, R.I., a corporation of Rhode Island Application March 1, 1957, Serial No. 643,294

2 Claims. (Cl. 286—24)

This invention relates to rotary seals and more particularly to an improved construction for sealing moving rotating surfaces against axial fluid leakage.

An object of the invention is to provide a simple and effective seal for the apertures between the segments of a tangentially split ring at least a portion axially of the inner face of which forms the running seal against a shaft surface.

Heretofore, it has been common to attempt to seal the splits between the segments of a tangentially split ring with a second radially segmented ring, the splits between the separate segments of which are offset circumferentially from the splits in the primary ring. In such constructions, it is necessary to provide a close running fit of both rings on the shaft. Sometimes this has been attempted with the use of separate external garter springs for each ring; and sometimes it has been attempted by countersinking the secondary ring in such manner that the garter spring acting on the primary ring tends also to exert radial pressure against the secondary ring. In both such constructions, however, the factor of wear tends to cause either imperfect running fits, excessive friction or other unbalance causing leakage and ultimate sealing failure.

In accordance with this invention, the secondary aperture-sealing ring is designed to have a sealing function against the shaft surface only at local circumferentially-spaced arcs overlapping the locations of the splits in the tangentially-split primary ring. Because of this limited function, it is not necessary to segment the secondary ring and hence it takes the form of a resiliently contractable piston ring having only a single split, which, in the assembly, is offset from the apertures between the segments of the primary ring. By utilizing a singly-split secondary ring, the inward tension required to maintain a running sealing fit against the shaft can be provided inherently in the secondary ring itself, by fabricating it of resilient material in such fashion that it exerts a yielding inward radial pressure on the shaft.

Conveniently, the secondary ring is countersunk in that face of the primary ring presented to the high pressure fluid to be sealed so that it is axially movable under the influence of the high pressure fluid towards the primary ring thus creating a seal against fluid leakage therebetween.

The precise construction of the seal of this invention will be more readily understood by referring to the accompanying drawings wherein:

Fig. 1 is a perspective exploded view of the primary tangentially-split ring;

Fig. 2 is a perspective view of the secondary singly-split ring prior to assembly, and indicating in dotted lines its expanded tensioned position when assembled on a shaft;

Fig. 3 is an elevational view of the high pressure side of the two rings before assembly on a shaft;

Fig. 4 is a similar view after assembly on a shaft;

Fig. 5 is a detail of the rear side of the primary ring as viewed in Fig. 3;

Fig. 6 is a view taken along the line 6—6 of Fig. 3;

Figs. 7 and 8 are cross-sectional views taken along the lines 7—7 and 8—8, respectively, of Fig. 4 and showing additional parts; and Fig. 9 is a detailed side elevational fragment, in cross-section in part, of certain of the additional parts shown in Figs. 7 and 8.

The primary ring 20 of Fig. 1 is a three segment tangentially-split ring of usual construction, except that it is provided compositely with a reentrant channel 22 of a radial depth greater than the depth of the radial splits in ring 20, for the reception of the secondary ring 24 shown in Fig. 2. Also, the internal surfaces of the segments of primary ring 20 are partially undercut as by the transverse channels 26 to reduce the axial dimension of the composite sealing surface 28, as best shown in Fig. 8, to only a fraction of the overall axial thickness of the composite ring 20. Rear surface of segmented ring 20 is machined to provide a lapped composite surface 29 terminating in lands 30 at the ends of each segment which extend along the edges of the tangential splits of the segments. Also, the rear composite face of segmented ring 20 has a series of lands 31 near its outer circumferential edge to bear against a radial housing wall 34, as shown in Figs. 7 and 8, to hold the primary ring against teetering.

The primary ring is provided with the usual outer peripheral channel 36 adapted to seat a conventional garter spring 38.

The secondary ring 24 of Fig. 2 has a series of axial undercuts 40 across its inner surface, except in three circumferentially spaced areas, one of which is seen in Fig. 2 at 42, where the undercuts 43 extend only partially across the inner face leaving localized sealing surfaces 44. A radially extending aligning pin 46 (Fig. 1) carried by the primary ring 20 extends into the split 47 in the secondary ring as shown in Figs. 3 and 4. The areas 42 are located circumferentially with respect to the aligning pin 46 so that they are opposite and overlap the three splits in the tangential ring, as shown in Fig. 6, where the tangential split in ring 20 is shown at 48.

Figs. 7 and 8 illustrate further elements old in the art such as an annulus 50 forming a seat for a series of circumferentially spaced springs 52, one of which is shown in Fig. 7 for maintaining the assembly in position before the application of fluid pressure. A spring support plate 53 is interposed between the springs 52 and the sealing rings. The entire assembly is maintained in the housing and up against housing wall 34 by a snap ring 54 lodged in an internal groove 56 in the housing.

A novel locking device serving to prevent rotation of the assembly in the housing includes a rim-like split ring 60, the extremities of which at 61 and 62 (Fig. 9) are hooked inwardly to catch in garter spring 38. A pin 64 seated in the housing extends inwardly to restrict rotation of ring 60 relative to the housing. It will be understood that the rim-like split ring 60 may be, if desired, affixed to the support ring 50 or made integral therewith.

It will thus be seen that the sealing surface 28 of primary ring 20 forms the radial seal as shown in Fig. 8 except at the three split areas where the localized running surfaces 44 of the secondary ring take over this function as shown in Fig. 7.

At the points illustrated in Fig. 7 a fine seal is maintained between the radially extending annular interface 68 between the two rings by reason of the axial thrust exerted by the high pressure towards the housing end wall 34.

It will be understood that when the assembly shown in Fig. 3 is placed over a shaft 70 as shown in Fig. 4 the secondary ring 24 is expanded against its resilience into the position shown in Fig. 4 and it thereby maintains its running seal at the three areas 44 by reason of its inherent contracting tension. Its outer diameter even in the expanded position as shown in Fig. 4 is still slightly less than the diameter of the composite channel 22 in the primary ring 20 when placed on the same shaft; so that the primary ring is free to contract with wear under the influence of garter spring 38 unhindered by the secondary ring 24 which maintains its even sealing pressure by reason of its own resilience. This clearance is, however, so small that it has not been shown in Fig. 4.

I claim:

1. A sealing ring assembly comprising a tangentially split segmented primary ring having a plurality of splits, each segment having an internal sealing surface adapted to bear against a shaft and each segment having a reentrant circumferentially extending channel countersunk in one face thereof to form a composite annular rectilinear groove on the high pressure side of said assembly, and a secondary ring comprising a resiliently contractable singly-split piston ring having a radially extending face seated in said composite groove with its split off-set from the splits in said primary ring and with its inner radially extending face bearing against the radially extending annular surface of said rectilinear composite groove to seal the assembly against fluid leakage between said rings when axial fluid pressure is exerted on the exterior face of said secondary ring, said secondary ring having a plurality of circumferentially spaced sealing surfaces adapted to bear under the tension of the resilience of said secondary ring against the shaft and overlapping circumferentially the splits in said primary ring, and the outside diameter of said secondary ring in its intended expanded position on the shaft being less than the diameter of said composite annular groove in the intended initial position of said primary ring on the same shaft whereby said primary ring may contract with wear without contracting said secondary ring.

2. A sealing ring assembly as claimed in claim 1 wherein each of the splits in the primary ring includes a radially extending portion merging into a tangentially extending portion, each of said radially extending portions having a radial depth, opposite the circumferentially spaced sealing surfaces of said secondary ring, less than the radial depth of the secondary ring, whereby said secondary ring overlies not only the radial portions of the splits in the tangentially-split segmented primary ring, but also overlies parts of the tangentially extending portions of the splits in said primary ring.

References Cited in the file of this patent

UNITED STATES PATENTS

| 701,730 | Irons | June 3, 1902 |
| 774,490 | Paine | Nov. 8, 1904 |
| 1,339,297 | Spicer | May 4, 1920 |
| 1,424,655 | Kurtz | Aug. 1, 1922 |
| 2,070,637 | Agger | Feb. 16, 1937 |

FOREIGN PATENTS

| 496,109 | Germany | Apr. 15, 1930 |
| 577,292 | Germany | May 29, 1933 |